United States Patent [19]

Miyoshi et al.

[11] 4,001,044
[45] Jan. 4, 1977

[54] DRY CELL

[75] Inventors: Jun Miyoshi, Miigaoka Neyagawa; Yoji Kajikawa, Katano; Akira Ota, Fujisaka Hirakata; Junichi Asaoka, Moriguchi; Yoshio Kino, Miyanosaka Hirakata, all of Japan

[73] Assignee: Matsushita Electrical Industrial Co., Ltd., Japan

[22] Filed: Sept. 11, 1975

[21] Appl. No.: 612,303

[30] Foreign Application Priority Data

Sept. 20, 1974 Japan .................... 49-109091
Sept. 20, 1974 Japan .................... 49-114257[U]

[52] U.S. Cl. .................... 429/166; 429/201; 429/229
[51] Int. Cl.² .................... H01M 6/06
[58] Field of Search .......... 136/107, 106, 102, 138, 136/146, 133

[56] References Cited

UNITED STATES PATENTS

| | | | |
|---|---|---|---|
| 3,338,750 | 8/1967 | Urry | 136/107 |
| 3,428,494 | 2/1969 | Watanabe et al. | 136/102 |
| 3,795,545 | 3/1974 | Kamai | 136/107 |
| 3,841,913 | 10/1974 | Anderson | 136/107 |
| 3,892,591 | 7/1975 | Uetani et al. | 136/102 |
| 3,905,834 | 9/1975 | Harada et al. | 136/107 |

Primary Examiner—John H. Mack
Assistant Examiner—C. F. LeFevour
Attorney, Agent, or Firm—Burgess, Ryan and Wayne

[57] ABSTRACT

A dry cell of the type enclosing therein an electrolyte mainly consisting of zinc chloride, wherein in order to ensure the more secure air- and liquid-tightness a filler or sealing agent is filled into the space between a plastic top seal and a metal top seal to seal a carbon electrode extended out of the plastic top and the upper end portion of a plastic tube covering the top surface of the plastic top seal, whereby the longer shelf life may be ensured.

9 Claims, 4 Drawing Figures

DRY CELL

BACKGROUND OF THE INVENTION

The present invention relates to an improvement of the Leclanché dry cells and more particularly a dry cell which encloses therein an electrolyte consisting mainly of zinc chloride and which has an improved depolarizing mix and a top sealing or closure construction.

The conventional Leclanché dry cells use in general two electrolyte compositions. One is the composition wherein both zinc chloride and ammonium chloride exist in liquid phase (which composition will be referred to as "the composition of the region A" hereinafter in this specification), and the other is the composition mainly consisting of zinc chloride with or without the addition of a minor constituent such as ammonium chloride (which composition will be referred to as "the composition of the region B" hereinafter in this specification). The composition of the region A is generally used in the dry cells from which a large current is intermittently drawn or a small current is continuously or intermittently drawn. But it has defects that the leak-proofness is not satisfactory and that the large current discharge characteristic is also not satisfactory. On the other hand, the dry cells using the composition of the region B exhibit the excellent large and medium current continuous and intermittent discharge characteristics so that they have recently attracted much attention and being further researched and developed for further improvements. For instance, it was reported that when the water content of the depolarizing mix containing the electrolyte mainly consisting of zinc chloride is 23 to 39%, the leak-proofness may be considerably improved. It was further reported that when the content of water relative to that of manganese dioxide, the content of chlorine which is present in the form of zinc chloride and hydrochloric acid, and the percentage by volume of the electrolyte are suitably controlled depending upon the concentration of the electrolyte, the discharge characteristics, the shelf life and the leak-proofness may be considerably improved.

From the standpoint of the depolarizing mix, the conventional dry cells may be divided into the paste electrolyte type and the paper-lined type. Recently, the paper-lined type is more preferred than the paste electrolyte type, and various separators for the paper-lined type have been devised and demonstrated. For instance, the effects of the density of sheets of paper used as the separators as well as the quantity of gelatinous paste applied thereupon have been extensively studied and tested, and there has been proposed a separator in which a film is used to prevent the movement of the gelatinous paste as well as water.

As to the top sealing or closing construction, various constructions consisting of the combinations of a plastic top seal and a metal top have been proposed, but they are still unsatisfactory in practice and do not provide the complete leak-proofness. Furthermore, the problem of the corrosion of a cathode cap by the electrolyte permeated through the carbon electrode during storage cannot be solved merely by improving the top sealing or closure construction.

As to the chemical composition of the depolarizing mix, the inventors made extensive studies and experiments in order to find out the effects of the chemical compositions of the regions A and B upon the discharge characteristics, the shelf life and the leak-proofness. One of the greatest differences between the two is the difference of movement of ions between the anode zinc can and the depolarizing mix during discharge. That is, in case of the composition of the region A, the ions moving during the discharge consist mainly of ammonium ions, but in case of the composition of the region B, the moving ions consist mainly of zinc ions. The discharge characteristics as well as the leak-proofness are much influenced by the difference in moving ions during the discharge, and the chemical composition of the electrolyte as well as its pH considerably affect the gelation of the starch used in the gelatinous paste over the separator and the corrosion of the zinc can. That is, in case of the composition of the region A, electric charge is carried mainly by ammonium ions and the concentration of the electrolyte is high. Consequently, the movement of zinc ions is difficult, and zinc ions dissolved out of the zinc can are trapped in the separator. As a result, there exists an ion concentration difference between the depolarizing mix and the vicinity of the zinc anode, and a thin layer of zinc diaminechloride is formed due to the reaction of ammonium ions diffused over the surface of the depolarizing mix, thus resulting in the rapid concentration polarization. It is this formation of the thin layer of zinc diaminechloride that adversely affects the continuous large current discharge characteristic. However, on intermittent discharge, the zinc ions are diffused during the idling time and the conductivity of the electrolyte is high (of the order of 420 m-moh) so that the satisfactory intermittent discharge characteristic may be attained.

As to the gelatinous paste layer of the separator, it has been proposed to use, as the electrolyte holding or keeping agent, various starches such as corn starch, wheat flour, potato starch and chemically processed starches such as bridged and/or etherificated starches, cellulose ethers and water-soluble synthetic resins. However, the effects of even starches, which are excellent and inexpensive materials, upon the electrolyte have not clarified yet. The hydrogen bonds in the molecular chains of starch are loosened by zinc ions so that the electrolyte may be held between the molecules by hydrogen bonds. In case of the composition of the region A, the zinc ions in the separator are considerably increased especially during the continuous large current discharge so that the starch particles are swelled. As a result, the molecular bonds are gradually weakened and finally collapsed so that the electrolyte is discharged. Furthermore, because of the osmosis due to the difference in concentration, water in the depolarizing mix moves into the separator and leaks from the anode. The ether and hydrogen gas produced when the depolarization capability of manganese dioxide deteriorates, leaks through the gaps in the top seal or closure out of the dry cell. The above is the reason why there are many leaks in the dry cells with the composition of the region A.

In case of the composition of the region B, the major moving ions are zinc ions so that the concentration polarization occurs less frequently. Furthermore, the quantity of the electrolyte is relatively less so that the zinc ion diffusion may be much facilitated. As a result, the continuous large current discharge characteristic is satisfactory; the leakage is less; and the leak-proofness is improved. The discharge characteristics as well as the leak-proofness are much affected by the selection of the swelling degree of starch used.

As to the volume of hydrogen gas produced toward the drop to a final voltage, the experiments conducted by the inventors showed that there is no difference between the compositions of the regions A and B.

Even when manganese dioxide, acetylene black and electrolyte in the depolarizing mix change more or less, the pH of the electrolyte extracted from the region A is 4.8 to 5.4 when 0.8 to 1.5 parts of zinc oxide is mixed to 100 parts of manganese dioxide. On the other hand, the pH of the electrolyte extracted from the region B is 3.8 to 4.5. The zinc corrosion is much affected by the pH value of the electrolyte, and the corrosion proceeds rapidly in the presence of oxygen. Therefore, in case of the composition of the region A, the influence of the air outside of the dry cell must be eliminated.

SUMMARY OF THE INVENTION

In view of the above, one of the objects of the present invention is to provide an excellent dry cell based upon the optimum combinations of the complex correlating factors such as the depolarizing mix, separator, enclosure construction and so on which affect various operation characteristics of the dry cell.

Another object of the present invention is to provide a dry cell enclosing therein an electrolyte mainly consisting of zinc chloride, wherein a filler or sealing agent is used to seal the carbon electrode extended out of the plastic top seal or closure and the portion of the plastic tube or jacket covering the top surface of the plastic top seal in order to improve both the shelf life and leak-proofness.

A further object of the present invention is to provide a dry cell wherein the chemical composition of the electrolyte in the depolarizing mix is improved so that the improved discharge characteristics may be attained.

A further object of the present invention is to provide a dry cell having the improved leak-proofness which is attained by the improvement of the carbon electrode as well as the separator.

A further object of the present invention is to provide a dry cell whose leakage is completely eliminated even when stored for a long time and which exhibits the excellent continuous and intermittent discharge characteristics even with a large current.

The above and other objects of the present invention are attained by a dry cell comprising an depolarizing mix consisting of manganese dioxide, carbon black and electrolyte mainly consisting of a zinc chloride; an anode consisting of a zinc can; a separator consisting of a paper sheet base and a gelatinous paste layer formed on the surface opposite to the surface in contact with the inner wall of said zinc can for separating said zinc can from said depolarizing mix; a cathode collector consisting of a carbon electrode, a plastic top seal for sealing the opened top of said zinc can, said plastic top seal being provided with a center hole through which is extended said cathode collector and a circular recess formed coaxially of said center hole over the top surface of said plastic top seal; a filler or sealing agent filled into said circular recess of said plastic top seal; a plastic tube or jacket enclosing said zinc can with the upper portion thereof extended into said circular recess of said plastic top seal and embedded therein with said filler or sealing agent; and a metal top seal placed over said plastic top seal and having a cathode cap formed integral therewith and fitted over the cathode collector extended upwards beyond said plastic top seal.

BRIEF DESCRIPTION OF THE DRAWING

The same reference numerals are used to designate similar parts.

DESCRIPTION OF THE PREFERRED EMBODIMENT

Figure 1:
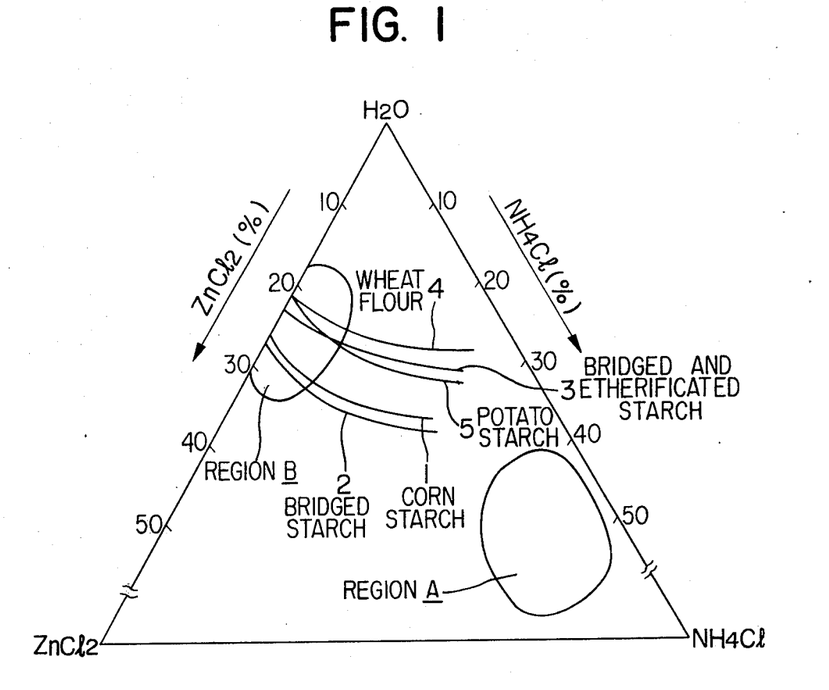
FIG. 1 is a phase diagram of an electrolyte consisting of water, zinc chloride and ammonium chloride.

In order to investigate the effects of various starches upon electrolytes, the inventors made extensive studies and experiments, and the results are shown in FIG. 1. Along each swelling characteristic line, the original volume of the starch is increased twofold at 20° C. It is seen that the higher the content of zinc, the more the swelling of the starches is increased. According to the experiments conducted by the inventors, it has been confirmed that some starches are swelled about 30 times as much as the original volume. In FIG. 1, the swelling characteristic curve 1 is that of corn starch; 2, that of bridged starch consisting of corn starch, 0.25 mol % of which is bridged with epichlorohydrin; 3, that of bridged and etherificated corn starch, 0.05 mol% being bridged with epichlorohydrin and the starch being etherificated with ethylene oxide at the degree of substitution of 0.15; 4, that of wheat flour; and 5, that of potato starch. The degrees of bridging and etherification may be suitably selected, but the volumetric expansion of the starches used in the dry cells is limited. The higher the zinc ion concentration, the greater the volumetric expansion of the starches becomes, and finally the molecular bond becomes so weak that the starch particles are collapsed.

Next referring to FIG. 2, a prior art dry cell will be described. Reference numeral 11 denotes a zinc can with a top opening 11b; 12, a carbon electrode; 14, a plastic top seal provided with a center hole through which is extended the carbon electrode 12 an annular groove 13; 15, a plastic tube or jacket; 17, a cathode cap attached to the plastic top seal 14 with an insulating ring 16 fitted into the annular groove 13 thereof; 18, an insulating paper; 19, a bottom reinforcement; 20, a sealing ring; 21, an outer jacket; 22, a depolarizing mix; 23, a separator; 24, a wax layer supporting washer; 25, a wax layer; 26, an air or expansion chamber; and 27, a metal sealed top.

Figure 2:
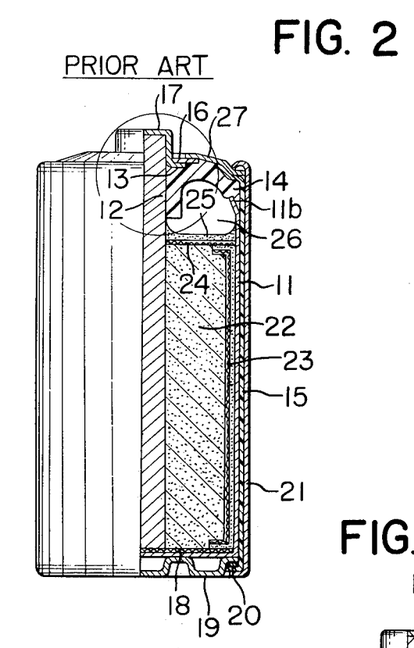
FIG. 2 is a partially sectional view of a prior art dry cell.

In the prior art dry cell of the type shown in FIG. 2, oxygen penetrating into the dry cell through the joint between the carbon electrode 12 and the plastic top seal 14; that is the portion encircled by a circle in FIG. 2, contributes about 80% of the degradation in the shelf life of the dry cell.

Figure 3:
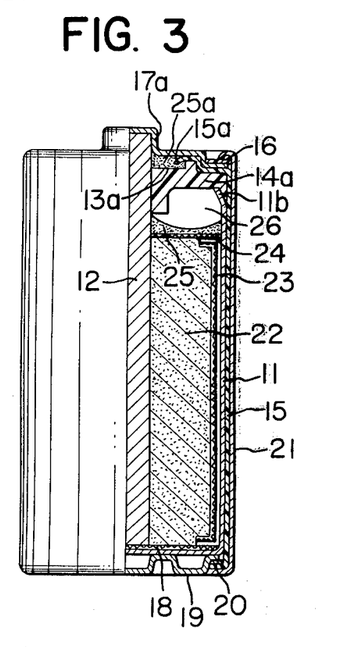
FIG. 3 is a partially sectional view of a dry cell in accordance with the present invention.

FIG. 3 shows one preferred embodiment of a dry cell in accordance with the present invention, and in FIG. 3 the component parts which are similar to those shown in FIG. 2 but are improved in accordance with the present invention in order to improve the shelf life are designated by the same reference numerals plus a suffix $a$.

The top opening 11b of the zinc can 11 is closed with a plastic top seal 14a provided with a center hole through which is extended the carbon electrode 12 so as to be centered and a circular recess 13a formed in the top surface of the plastic top seal 14a coaxial with its center hole. The plastic tube or jacket 15 which covers the top surface of the plastic top seal 14a extends over the boundary or ridge of and into the circular recesse 13a so that the edge portion 15a may be embedded into the circular recess 13a with a suitable filler of a high viscosity such as pitch or rubber. A metal top seal 17a formed integral with the cathode cap is fitted over the plastic top seal 14a, and extending along the periphery of the metal top seal 17a is placed an insulating ring 16a. The outer jacket 21 is fitted over the zinc can 11 and has its upper edge portion folded inwards 180° toward and pressed against the top of the insulating ring 16a, whereby the zinc can 11 may be sealed. Since the edge portion of the outer jacket 21 is pressed against the insulating ring 16a, the undersurface of the metal top seal 17a is firmly pressed against the upper surface of the filler 25a. Therefore, the joint between the plastic top seal 14a and the plastic jacket 15a as well as the joint between the plastic top seal 14a and the carbon electrode 12 are securely sealed with the filler 25a so that the leakage of the electrolyte through these joints may be completely prevented. Thus, the leak-proofness or liquid-tightness of the dry cell in accordance with the present invention may be remarkably improved.

According to the present invention, in addition to the improvement of the leak-proofness or liquid-tightness of the dry cell, the dry cell characteristics may be also improved. The dry cell operation characteristics are in general dependent upon the composition of the electrolyte in the depolarizing mix, the quantity thereof and the quantity of the starch (the degree of swelling).

Figure 4:
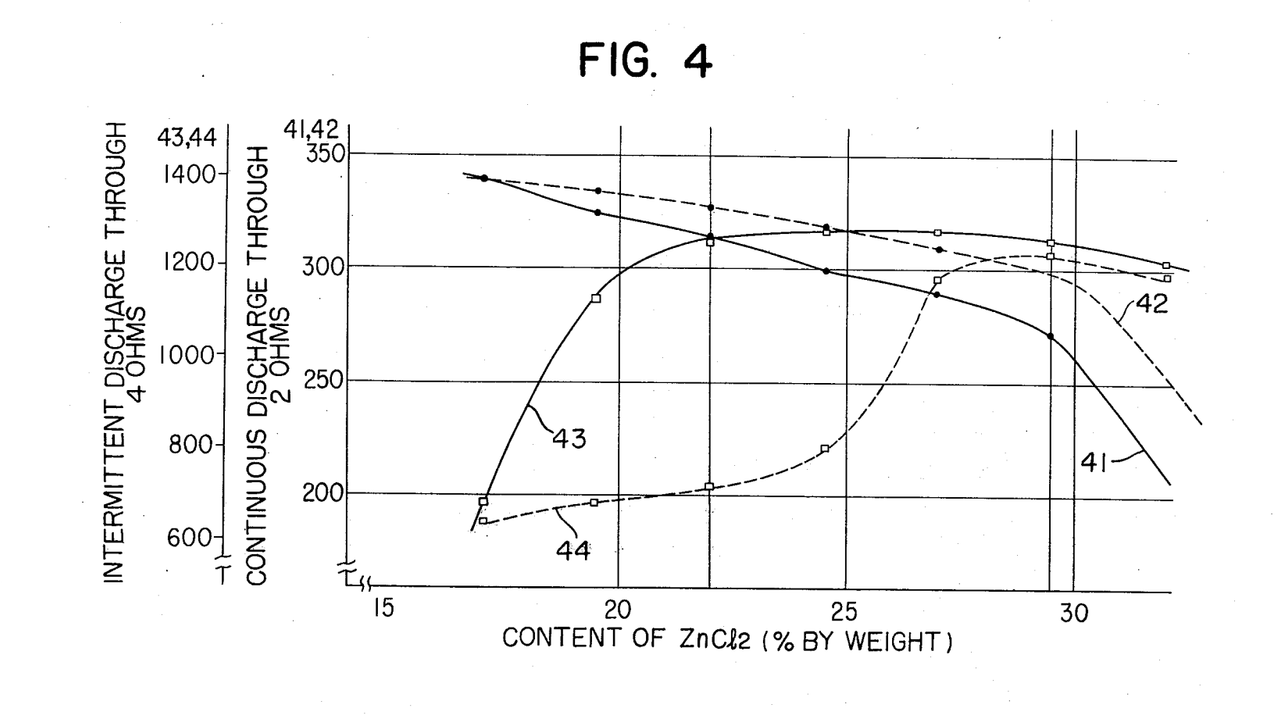
FIG. 4 is a diagram illustrating the relationship between the minutes to a final voltage and the concentration of zinc chloride.

Some examples of the present invention are shown in Table 1, and their test results are shown in FIG. 4.

tinuously through a load of 2 ohms; 43 the discharge curve when the dry cell with the gelatinous paste containing CE was intermittently discharged through a load of 4 ohms at a rate of 4 minutes per hour and 8 hours per day; 44, the discharge curves when the dry cell with the gelatinous paste containing C was intermittently discharged at the above rates.

When the quantity of the electrolyte is too much, the paste becomes too soft while when the quantity is too little, the paste collapses when it is formed. Therefore, the quantity is so selected as to attain the best formability.

The separator 23 which is in contact with the depolarizing mix was prepared in the following manner. A double-ply kraft paper sheet consisting of a first ply or layer of 50 $\mu$ in thickness made of the pulp of the degree of beating of 300 to 600 cc (measured by the Canadian freeness instrument) and a second ply or layer of 50 $\mu$ in thickness made of the pulp of the degree of beating 800 to 850 cc was prepared by the conventional paper sheet making method. Upon the surface of the layer of the low degree of beating was applied a layer of C or CE shown in FIG. 1 at a rate of 36 to 44 g/m².

The dry cell enclosures were prepared in accordance with R-20, I.E.C. Standards, and the top enclosure of the type shown in FIG. 2 was employed.

Referring back to FIG. 4, it is seen that the lower the concentration of the electrolyte, the better the continuous discharge characteristic becomes and that the smaller the volumetric expansion ratio of starch, the better the continuous discharge characteristic is. The intermittent discharge characteristic is closely related with the volumetric expansion ratio of starch, and is not satisfactory unless the ratio is in excess of 3.0.

In both the continuous and intermittent discharge tests with the loads of 2 and 4 ohms, the terminal volt-

TABLE 1

| SAMPLE NOS. | | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|---|
| DEPOLAR-IZING | manganese dioxide (g) | | | 500 | | 500 | | 500 | | 500 | | 500 | | 500 | | 500 |
| | acetylene black (g) | | | 100 | | 100 | | 100 | | 100 | | 100 | | 100 | | 100 |
| | zinc oxide | | | 5 g | | 5 g | | 5 g | | 5 g | | 5 g | | 5 g | | 5 g |
| | electrolyte (ml) | | | 326.1 | | 326.1 | | 326.1 | | 326.1 | | 326.1 | | 326.1 | | 326.1 |
| COMPO-SITION | zinc chloride (% by weight) | | | 17.0 | | 19.5 | | 22.0 | | 24.5 | | 27.0 | | 29.5 | | 32 |
| | ammonium chloride (% by weight) | | | 4 | | 4 | | 4 | | 4 | | 4 | | 4 | | 4 |
| | water (% by weight) | | | 79 | | 76.5 | | 74 | | 71.5 | | 69.0 | | 66.5 | | 64 |
| | H₂O/MnO₂ weight ratio | | | 0.598 | | 0.590 | | 0.582 | | 0.574 | | 0.565 | | 0.556 | | 0.546 |
| starches | | | C | CE | C | CE | C | CE | C | CE | C | CE | C | CE | C | CE |
| volumetric expansion ratio of starch | | | 1 | 1 | 1 | 1.5 | 1 | 3.0 | 1.5 | 5.6 | 2.1 | 8.9 | 5.0 | 10.4 | 8.0 | 13.8 |

In Table 1, C designates a bridged starch, and CE, a bridged and etherificated starch. In FIG. 4, the curve 41 indicates the discharge curve when the dry cell with CE was continuously discharged through a load of 2 ohms; 42, the discharge curve when the dry cell with the gelatinous paste containing C was discharged conage was 0.9V. Similar characteristics were found when load current is drawn continuously through the load of 4 ohms, and when load current is drawn intermittently through the load of 2 ohms or 4 ohms more than an hour a day. The intermittent discharge characteristic of the dry cell which was discharged through a 10-ohm load was similar to the intermittent discharge characteristic of the dry cell which was discharged intermittently through a 4-ohm load at a rate of 4 min/hr. and 8 hr./day.

The satisfactory discharge characteristics may be obtained when the concentration of zinc chloride is 22.5 to 29.5% in weight and when the volumetric expansion ratio is between 3.0 and 10.4 at 20° C. From the experiments conducted by the inventors, it was found that the concentration of ammonium chloride less than 2% by weight results in the greater local corrosion of zinc and that when the concentration exceeds 5.5% by weight, the intermittent discharge with a large current is adversely.

In order to investigate the relation with the leak-proof characteristic described above, the ratio between manganese dioxide and acetylene black was varied as shown in Table 2 while the optimum concentration of 24.5% by weight of zinc chloride remained unchanged.

this ratio, the discharge characteristics also reach their peak. Thus, in order to attain the satisfactory leak-proofness the ratio by weight of $H_2/MnO_2$ must be in excess of 0.57.

The leak-proofness is also greatly dependent upon the top closure construction. Four-hundred dry cell samples were prepared. That is, 100 dry cells with the enclosure construction as shown in FIG. 2 and with the chemical composition shown in the column No. 8, in Table 1;

100 dry cells with the enclosure construction as shown in FIG. 2 and with the chemical composition shown in the column No. 17, in Table 2;

100 dry cells with the enclosure construction as shown in FIG. 3 and with the chemical composition shown in the column No. 8 in Table 1; and 100 dry cells with the enclosure construction as shown in FIG. 3 and with the chemical composition shown in the column No. 17, in Table 2.

These dry cell samples were tested for the leakage or

TABLE 2

| sample Nos. | 15 | 16 | 17 | 18 | 19 |
|---|---|---|---|---|---|
| manganese dioxide (g) | 200 | 400 | 500 | 600 | 800 |
| acetylene black (g) | 100 | 100 | 100 | 100 | 100 |
| zinc oxide (g) | 2 | 4 | 5 | 6 | 8 |
| electrolyte (ml) | 276.6 | 309.6 | 326.1 | 342.6 | 375.6 |
| weight ratio $H_2O/MnO_2$ | 1.217 | 0.681 | 0.574 | 0.502 | 0.413 |
| leakage (ml/cell) | 0 | 0 | 1.2 | 5.8 | 7.7 |
| continuous discharge through 2 ohms to final voltage 0.9V (Min) | 280 | 340 | 300 | 280 | 230 |
| intermittent discharge through 4 ohms 4 min/hr and 8 hr/day to final voltage 0.9V (min) | 700 | 1240 | 1290 | 1280 | 960 |

Table 2 also shows the quantity of leaked liquid as well as the discharge characteristics. It is seen that the quantity of leaked liquid is considerably reduced when the ratio by weight of $H_2O/MnO_2$ is in excess of 0.57. With leak-proofing characteristics as well as the shelf life. The results were shown in Table 3.

TABLE 3

| | | | Prior Art | | Invention | |
|---|---|---|---|---|---|---|
| | | | one month after the start of discharge | 2 months after the start of discharge | one month after the start of discharge | 2 months after the start of discharge |
| shelf life | Numbers of dry cells leaked | continuous discharge through 2 ohms | 22 ps/100 ps | 36 ps/100 ps | 0 ps/100 ps | 0 ps/100 ps |
| | | continuous discharge through 20 ohms | 2 ps/100 ps | 6 ps/100 ps | 0 ps/100 ps | 0 ps/100 ps |
| | fresh cells | continuous discharge through 2 ohms to final 0.9V (min) | 300 | | 300 | |
| | | intermittent discharge through 4 ohms 4 min/hr and 8 hrs/day to final 0.9V (min) | 1290 | | 1290 | |
| | 6 months after the start of discharge at 45° C | continuous discharge through 2 ohms to final 0.9V (min) | 240 | | 280 | |
| | | intermittent discharge through 4 ohms 4 min/hr and 8 hrs/day to final 0.9V (min) | 910 | | 1160 | |
| | A year after the starting of discharge at room temp. | continuous discharge through 2 ohms to final 0.9V (min) | 270 | | 290 | |
| | | intermittent discharge through 4 ohms 4 min/hr and 8 hrs/day to final 0.9V (min) | 1100 | | 1250 | |

From Table 3 it is clearly seen that the dry cell samples with the enclosure construction shown in FIG. 3 exhibit the excellent leak-proofing characteristics and shelf life characteristics.

In addition to pitch and rubber, a mixture of asphalt with soy bean oil, wax, grease, paraffin, vaseline and silicon resins were used.

As is clear from Table 3, the quantity of leaked liquid was relatively less when the chemical composition was that shown in the column No. 17, in Table 2, but when the chemical composition was filled in the prior art dry cell enclosure of the type shown in FIG. 2, some leakage was observed as the liquid-tightness is not satisfactory.

The carbon electrode used consists of 70% by weight of coal coke and 30% by weight of natural graphite with an apparent specific gravity of 1.6, a paraffin permeability of 8% and a gas permeability 0.2cc per minute under the pressure of 3 atom. nitrogen gas.

The problem of the corrosion of the cathode cap by the liquid rising through the carbon electrode by the cappillary action during storage may be solved by the selection of suitable carbon electrode materials and by the water-proofing or liquid sealing methods. One of the major causes of the penetration of the liquid through the carbon electrode is due to the discharge between manganese dioxide and carbon electrode. The inventors found out that when the potential of zinc dioxide is applied to the carbon electrode the current flowing between the carbon electrode and electrolyte greatly affects the permeation of liquid into the carbon electrode.

The tighter the top sealing of the dry cell, the higher the osmotic pressure of the electrolyte permeating into the carbon electrode becomes. That is, when the tight top seal is provided, the corrosion of zinc may be minimized but the manganese dioxide is maintained at a high potential level. The inventors found out that it is this high potential that accelerates the permeation of the electrolyte into the carbon electrode, and that this high potential of manganese dioxide consists of a component due to the pH of the electrolyte and the inherent potential level of manganese dioxide.

For instance, in case of the paper-lined type dry cell which encloses the composition of the region B and whose top sealing construction is extremely unsatisfactory, the permeation of the electrolyte into the carbon electrode is almost not observed, but the corrosion of zinc is accelerated by the presence of oxygen. As a result, the shelf life is adversely affected by the change in pH of the electrolyte and by the decrease in the potential level of manganese dioxide. Therefore the dry cell of this type cannot be used in practice.

In order to find out the materials for the carbon electrode which may exhibit the high resistance to the permeation of the electrolyte even at a high potential level, the inventors made extensive studies and experiments and found out that petroleum coke, coal coke and synthetic graphite are very excellent for the materials of the carbon electrodes. The inventors also found out that the area of the carbon electrode in contact with manganese dioxide also affects the permeability and that the porous materials with the apparent density between 1.5 and 1.7 g/cm$^2$ are excellent. When the porosity of a material which may be expressed in terms of the apparent density, is too high, the mechanical strength of the carbon electrode is reduced and the water-proofing treatment becomes difficult. On the other hand, when the porosity is low, the area of contact of the carbon electrode with manganese dioxide is increased, thus resulting in the increase in permeability.

As described above, coke is an excellent material for carbon electrodes, but a problem arises when carbon electrodes are formed by extrusion forming. Therefore, natural graphite must be added to coke.

In the region A, the potential of manganese dioxide is 0.50 to 0.63V relative to the saturated calomel electrode, and in the region B, it is 0.60 to 0.73V. That is, in the region B, manganese dioxide has a potential 0.1V higher than in the region A so that in the region A, the ratio of natural graphite is the order of 35% by weight, but in the region B, the maximum ratio is 50% by weight.

Table 4 shows the compositions of some examples of the carbon electrodes in accordance with the present invention. It also shows the leak-/or/water-proofness, the number of samples whose cathode cap was corroded during storage and the current when the electrode 8 mm in diameter and 57 mm in length was immersed in 45 mm in the electrolyte with the composition shown in the column No. 7 or 8 in Table 1 and was so biased relative to the saturated calomel electrode as to have a potential of + 0.6V.

TABLE 4

| sample Nos. | | 20 | 21 | 22 | 23 | 24 | 25 | 26 | 27 |
|---|---|---|---|---|---|---|---|---|---|
| ratio | coal coke (%) | 90 | | 70 | | 50 | | 30 | |
| | graphite (%) | 10 | | 30 | | 50 | | 70 | |
| water-proofness (%) | | 4 | 8 | 4 | 8 | 4 | 8 | 4 | 8 |
| current at −0.6V + 0.6V (mA) | | 0.05 | 0.04 | 0.1 | 0.07 | 0.15 | 0.10 | 0.23 | 0.16 |
| Numbers of corroded caps | 6 months after the start of discharge at 45° C (ps) | 0/100 | 0/100 | 0/100 | 0/100 | 6/100 | 0/100 | 23/100 | 6/100 |
| | A year after the starting of discharge at room temp. (ps) | 0/100 | 0/100 | 0/100 | 0/100 | 4/100 | 0/100 | 14/100 | 4/100 |
| permeability under the pressure of 3 atm. nitrogen gas | | 6 | 0.5 | 4 | 0.4 | 1.0 | 0.2 | 0.4 | 0.3 |

TABLE 4-continued

| sample Nos. | 20 | 21 | 22 | 23 | 24 | 25 | 26 | 27 |
|---|---|---|---|---|---|---|---|---|
| (ml/min) | | | | | | | | |

From Table 4, it is seen that the liquid permeability of the carbon electrodes is dependent upon the materials and the water-proof-treatment, but is independent of the gas permeability under the pressure of 3 atm. nitrogen gas. That is, the absolute condition is that the magnitude of current per permeation area described must be less than 0.1 mA when the potential is +0.6V.

The data shown in FIG. 4 were obtained from the tests of the dry cell samples with the enclosure construction shown in FIG. 3 and with the chemical composition shown in the column No. 18, in Table 2. And the separator of the type described above was used.

The shelf life of the dry cells is dependent not only upon the top sealing construction but also upon the swelling degree of starches and the degree of beating of the paper or pulpboard used as the separator base, but is independent of the density thereof. Table 5 shows the relationship of the shelf life of the dry cell samples with the density and the degree of beating of the paper sheet or pulpboard separator bases thereof. The chemical composition is that shown in the column No. 17 in Table 2, and both the carbon electrode and dry cell enclosure were prepared in accordance with the present invention as described above. The degree of beating was measured by the Canadian freeness instrument. In case of the paper sheet consisting of a layer of pulp with a high degree of beating and another layer of pulp with a low degree of beating, a CE starch layer was applied over the surface of the layer with a low degree of beating at a rate of 36 to 40 g/m² as with the examples shown in Table 1, and the same is true for other sheets.

TABLE 5

| | sample Nos. | | 28 | | 29 | | 30 | | 31 | | 32 | |
|---|---|---|---|---|---|---|---|---|---|---|---|---|
| | degree of beating thickness (cc μ) | | 850 | 100 | 800 | 100 | 600 | 100 | 500 850 | 50 50 | 300 850 | 20 80 |
| | density (g/cm²) | | 0.63 | | 0.72 | | 0.75 | | 0.68 | | 0.65 | |
| shelf life | fresh cells | voltage | 1.66V | | 1.66V | | 1.66V | | 1.66V | | 1.66V | |
| | | current | 11.5A | | 11.5A | | 11.5A | | 11.5A | | 11.5A | |
| | 5 mths. after the start of discharge at 45° C | voltage | 1.59V | | 1.59V | | 1.61V | | 1.61V | | 1.61V | |
| | | current | 3.4A | | 3.8A | | 9.2A | | 9.0A | | 8.8A | |
| | A year after the starting of discharge at room temp. | voltage | 1.61V | | 1.61V | | 1.62V | | 1.62V | | 1.62V | |
| | | current | 4.8A | | 5.2A | | 10.5A | | 10.5A | | 10.0A | |

From Table 5, it is seen that the separators with a high degree of beating contribute to the improvement of the shelf life, and the preferable range of the degree of beating is between 300 and 600cc.

The inventors also conducted studies and experiments in order to find out the optimum quantity of starch applied to the surface of the separators for the best result of the shelf life, and found out that the optimum quantity is between 24 and 45 g/m². When the application quantity is less than 24 g/m², the increase in the corrosion of zinc during storage results. On the other hand, when it exceeds 45 g/m², the concentration polarization is accelerated so that the shelf life is adversely affected.

In summary, according to the present invention, in order to ensure the optimum discharge characteristics of the dry cells, the concentration of zinc chloride must be 22.5 to 29.5% by weight; that of ammonium chloride must be 2 to 5.5% by weight; and the volumetric expansion ratio of starch must be 3.0 to 10.4. The starches used may be corn starch, processed starches such as C and CE, potato starch and wheat starch, and the application quantity is of the order of 24 to 45 g/m². In order to ensure the longest shelf life and to minimize the leakage of electrolyte, the weight ratio of $H_2O/MnO_2$ must be in excess of 0.57, and the current flowing through the carbon electrode must be less than 0.00846 mA/cm² at a potential of +0.6V relative to the saturated calomel electrode. And the pulp of the sheets used as the separators must have the degree of beating between 300 and 600cc measured by the Canadian freeness instrument. The top seal construction must be such that, as described above with reference to FIG. 3, the carbon electrode as well as the plastic tube or jacket must be sealed with the liquid or semiliquid filler over the plastic sealing. When these conditions are met, there may be provided the excellent dry cells with the optimum discharge characteristics, long shelf life and liquid- or electrolyte-tightness.

What is claimed is:

1. A dry cell comprising
   a. a depolarizing mix comprised of manganese dioxide, carbon black and electrolyte comprised of zinc chloride and ammonium chloride,
   b. an anode comprising a zinc can having an open top,
   c. a separator comprising a paper sheet base and a gelatinous paste layer formed on the surface opposite to the surface in contact with the inner wall of said zinc can for separating said zinc can from said depolarizing mix,
   d. a cathode collector within said zinc can and separated therefrom, and comprising a carbon electrode,
   e. a plastic top seal for sealing the open top of said zinc can, said plastic top seal being provided with a center hole through which said cathode collector extends, said plastic top seal having an annular recess ridge and an annular recess in its top surface and coaxial with said center hole, said annular recess being radially inwardly of said ridge, f. a filler or sealing agent filling said annular recess of said plastic top seal, g. a plastic tube or jacket surrounding the radially outer periphery of said zinc can, the upper portion of said plastic tube or jacket extending radially inwardly over the top of said zinc can and into said annular recess of said plastic top seal, the edge of said upper portion being embedded in said filler or sealing agent in said annular recess, and h. a metal top seal placed over said plastic top seal and having a cathode cap formed integral therewith and fitted over the cathode collector, said cathode collector extending upwardly from the top of said plastic top seal.

2. A dry cell as set forth in claim 1 wherein
said filler or sealing agent is selected from a group consisting of a mixture of asphalt as a major component with a mineral oil or vegetable oil, wax, grease, paraffin, vaseline and silicon resins.

3. A dry cell as set forth in claim 1 wherein
said depolarizing mix contains water in excess of 0.57 by weight based on manganese dioxide,
the content of zinc chloride in said electrolyte is between 22.5 and 29.5% by weight, and
the content of ammonium chloride in said electrolyte is between 2 and 5.5% by weight.

4. A dry cell as set forth in claim 1 wherein
the current density of the current flowing through said carbon electrode is less than 0.00846 mA/cm$^2$ when the potential of said carbon electrode is +0.6V relative to a saturated calomel electrode at 20° C.

5. A dry cell as set forth in claim 1 wherein
the paper sheet of said separator consists of the pulp of the degree of beating between 300 and 600cc measured by a Canadian freeness instrument.

6. A dry cell as set forth in claim 1 wherein
said gelatinous paste layer contains a starch selected from the group of corn starch, a processed starch such as bridged or/and etherificated starch, potato starch and wheat starch, and the volumetric expansion ratio of the volume of the starch after the gelation by the electrolyte to the original volume is between 3.0 an 10.4.

7. A dry cell as set forth in claim 1 wherein said gelatinous paste layer is formed on said opposite surface in an amount from 24 to 45 g/m$^2$.

8. A dry cell comprising
a. a depolarizing mix comprised of manganese dioxide, carbon black and an electrolyte comprised mainly of zinc chloride and including ammonium chloride,
b. an anode comprising a zinc can having an open top,
c. a separator comprising a paper sheet base and a gelatinous paste layer formed upon the surface opposite to the surface in contact with the inner wall of said zinc can for separating said zinc can from said depolarizing mix, said paper sheet base comprising a sheet having a first layer, on the side of said zinc can, made of the pulp with a low degree of beating and a second layer, on the side of the inner wall of said depolarizing mix, made of the pulp with a high degree of beating,
d. a cathode collector consisting of a carbon electrode,
e. a plastic top seal for sealing the open top of said zinc can, said plastic top seal having a center hole, and an annular recess in its top surface radially inwardly of the outer periphery of said plastic top seal, said annular recess being coaxial with said center hole, said cathode collector extending upwardly through said center hole,
f. a filler or sealing agent filling said annular recess of said plastic top seal,
g. a plastic tube or jacket surrounding the radially outer periphery of said zinc can with the upper portion of said plastic tube or jacket extending radially inwardly from the top of said zinc can and into said annular recess of said plastic top seal, the edge of said upper portion being embedded in said filler or sealing agent in said annular recess,
h. a metal top seal placed over said plastic top seal and having a cathode cap formed integral therewith and fitted over the cathode collector, said cathode collector extending upwardly from the top of said plastic top seal, and
i. a metal jacket enclosing said plastic tube or jacket.

9. The dry cell of claim 8 further comprising an insulating ring positioned on top of said metal top seal at the radially outer edge of said metal top seal, the upper edge of said metal jacket being folded inwardly and pressed against the top of said insulating ring.

* * * * *

UNITED STATES PATENT OFFICE
CERTIFICATE OF CORRECTION

Patent No. 4,001,044                    Dated January 4, 1977

Inventor(s)          Jun Miyoshi, et al

It is certified that error appears in the above-identified patent and that said Letters Patent are hereby corrected as shown below:

Column 7, line 14:  After "adversely" insert --affected--.

Column 13, line 50:  Change "an" to --and--.

Signed and Sealed this

Twentieth Day of September 1977

[SEAL]

Attest:

RUTH C. MASON
Attesting Officer

LUTRELLE F. PARKER
Acting Commissioner of Patents and Trademarks